United States Patent [19]

Donald

[11] Patent Number: 4,566,664

[45] Date of Patent: Jan. 28, 1986

[54] ROTATABLE MOUNTING UNIT

[76] Inventor: Jimmie W. Donald, O. W. Donald Co., 2800 N. 50th, Fort Smith, Ark. 72904

[21] Appl. No.: 617,062

[22] Filed: Jun. 4, 1984

[51] Int. Cl.$^4$ ............................................. A47B 49/00
[52] U.S. Cl. ...................................... 248/349; 248/418
[58] Field of Search ............... 248/349, 425, 418, 130; 108/142, 94

[56] References Cited

U.S. PATENT DOCUMENTS

| | | | |
|---|---|---|---|
| 757,759 | 4/1904 | Maidhof | 248/349 |
| 1,689,407 | 10/1928 | Skaer | 248/349 |
| 2,351,293 | 6/1944 | Saunders | 248/349 |
| 2,659,920 | 11/1953 | Bogan | 248/349 |
| 3,056,376 | 10/1962 | Bender | 248/349 |
| 3,063,714 | 11/1962 | Krauss | 248/349 |
| 3,353,777 | 11/1967 | Knoedler | 248/349 |
| 3,409,265 | 11/1968 | Wichers | 248/349 |
| 3,815,146 | 6/1974 | Nash | 248/349 |
| 4,068,961 | 1/1978 | Ebner | 248/181 |
| 4,363,460 | 12/1982 | Carroll | 248/425 |
| 4,365,779 | 12/1982 | Bates | 248/179 |
| 4,378,943 | 4/1983 | Newberry | 248/349 |
| 4,401,287 | 8/1983 | Moeser | 248/425 |

Primary Examiner—Reinaldo P. Machado
Assistant Examiner—Alvin Chin-Shue
Attorney, Agent, or Firm—Robert R. Keegan

[57] ABSTRACT

There is disclosed a rotatable mounting unit including two molded plastic parts, one of which is circular and adapted to be screwed to a counter, shelf, or the like as a base while the other part is rectangular and screwed to a television receiver of the like and acts as a platform therefor. The platform and base are secured together by placing a recess in the platform over a cylinder in the base in a manner to cause a post in the center of the recess to enter an opening in the center of the base with two lugs extending from the post passing through slots extending from the opening in the base. Upon rotation of the platform relative to the base the lugs slightly distort to firmly engage a flange around the opening in the base locking the two parts together but allowing them to be rotated. Detents consisting of button-like projections on the platform cooperating with holes around the cylinder of the base provide a detent function at approximately 20 degree intervals of rotation. Because the cylinder of the base extends into a recess in the platform, the overall height of the structure is low; screws are concealed when the unit is assembled.

18 Claims, 5 Drawing Figures

ROTATABLE MOUNTING UNIT

The present invention relates to rotatable mounting units used in mounting television receivers or other objects on a flat surface such as a table or counter, and more particularly to such units especially adapted for mounting television receivers on counters or shelves in recreational vehicles. The rotatable mounting unit of the present invention is particularly adapted for use in vans, motor homes and other such vehicles. It is also adapted to mount tackle boxes or other boatman's gear in fishing boats or pleasure boats.

Numerous types of rotatable mounting apparatus of varying degrees of complexity have been devised including those patterned after the well-known lazy-susan. None of the previously known such apparatus has provided all of the desirable features for a rotatable mounting unit for recreational vehicles as does the device of the present invention.

The rotatable mounting unit of the present invention is composed of only two molded plastic parts, one of which is secured by mounting screws to the television receiver and the other to the flat surface of a counter, shelf, or the like on which the television receiver is to be mounted. Each of the parts is adapted to be formed of a rugged plastic material typically of the multipolymer type and in particular may be formed of an ABS thermoplastic manufactured under the "Lexax" tradename by Monsanto Polymer Products Co.

The two parts assemble and disassemble only at two angular relationships in which the lugs on the top platform part pass through similarly shaped slots or notches in the base part. After being assembled and turned relative to one another the two parts are held together by the engagement of the robust lugs with an equally rugged central cylinder portion of the base element. This arrangement is far more resistant to separation of the two parts by breaking or deformation of a part than would be the case with other common forms of interconnections such as a bolt passing through a central hole in the two parts. The overall height of the unit is short because the upstanding part of the base unit fits within a recess in the platform unit; this arrangement also provides large bearing surfaces for lateral forces. Such lateral forces may be very significant when a unit is used to mount a television receiver of twenty pounds or more and the vehicle in which it is mounted is rapidly decelerated or accelerated.

A detent mechanism is provided so that the unit will remain in a rotational position to which it is manually turned, and these positions are separated by about 20 degrees. Thus, inadvertent rotation of the platform and the television receiver or other device mounted thereon is prevented.

The resilience of the lugs and the force fit between the lugs and their bearing surface on the base causes the base and platfrom to be held together very snugly with virtually no slack or wobble. Also the relationship of the two parts and their dimensions are such that there is a clearance of only about 1/16 inch or less between the bottom edge of the platform and the surface on which the base is mounted. This permits the platform to be turned without scratching or marring the surface and at the same time causes the tilt of the platform under the influence of lateral forces to be limited to an almost negligible degree.

In addition to providing the above described features and advantages it is an object of the present invention to provide a rotatable mounting unit for securing the cabinet of a television receiver or a similar case or cabinet on a flat horizontal surface in a van, boat, or other vehicle which will keep the case or cabinet securely in position in the presence of both vertical and horizontal forces on the case.

It is another object of the present invention to provide a rotatable mounting unit for mounting a television receiver or the like in a recreational vehicle, such unit having a platform with lugs on a central cylinder which are insertable in slots in a circular plate in a base and which serve to lock the two parts together when they are relatively rotated.

It is a further object of the present invention to provide a rotatable mounting unit having a platform of molded plastic with a central cylindrical recess and radial reinforcing ribs extending therefrom to the outer rectangular wall of the platform and wherein the cylindrical recess sidewalls form the lateral bearing surface with a base having an upstanding portion.

It is still another object of the present invention to provide a rotatable mounting unit having a detent mechanism in which approximately eighteen holes in the stationary portion of the unit are engaged by a plurality of dome-like buttons thereby defining a plurality of detent positions spaced apart by approximately 20 degrees of rotation.

It is yet another object of the present invention to provide a rotatable mounting unit having holes therein for mounting screws which are accessible when the two parts of the mounting unit are separated, but which are inaccessible and invisible when the television receiver or other object is fastened to the mounting unit and the two parts thereof are engaged.

Other objects and advantages of the present invention will be apparent from consideration of the following description in conjunction with the appended drawings in which.

Figure 1:
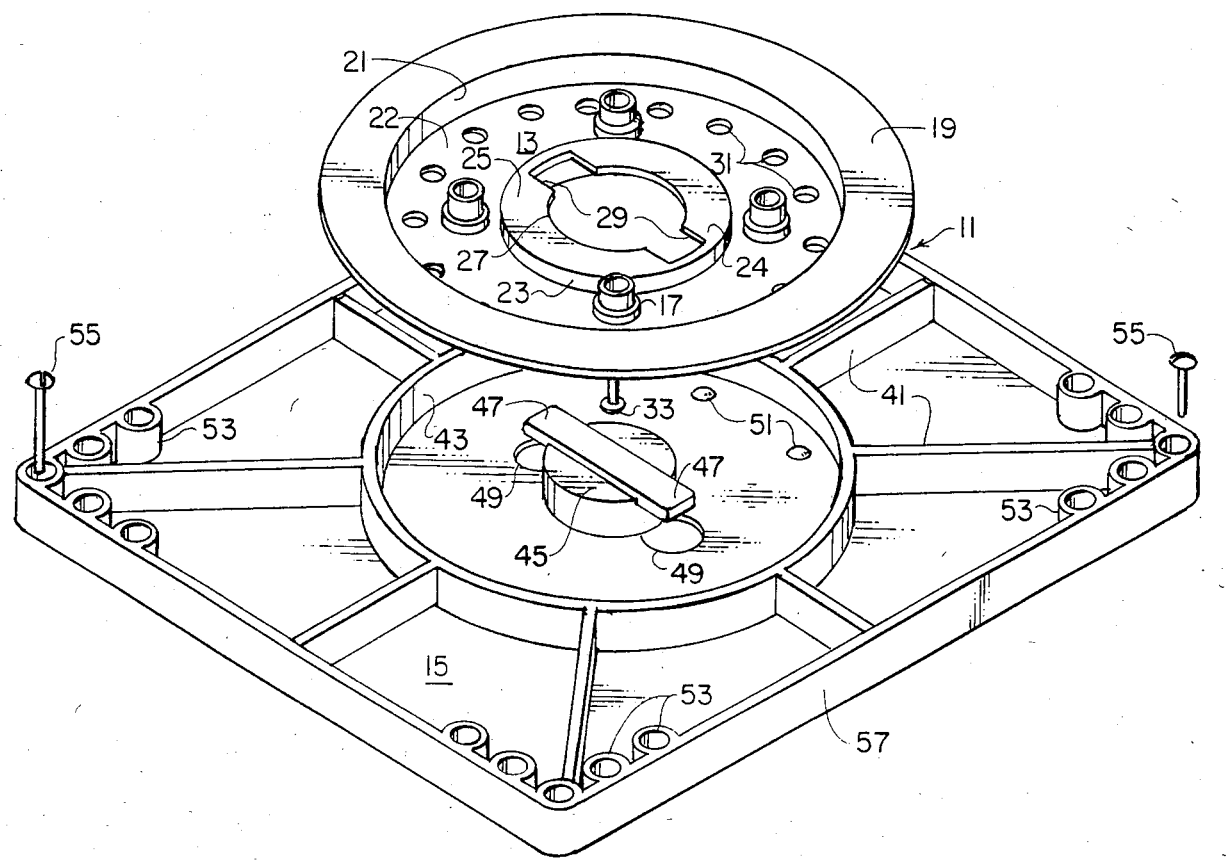
FIG. 1 is an isometric exploded view of the mounting unit in inverted position.
Figure 2:
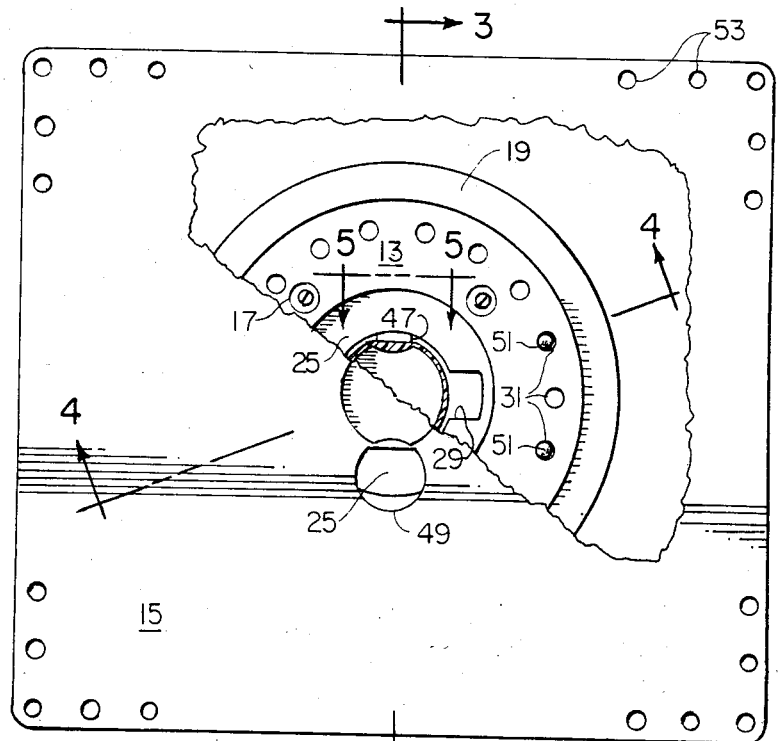
FIG. 2 is a top plan view of the apparatus of the invention partially broken away to show the top of the base.

Referring now to the drawings and particularly to FIG. 1 the rotatable mounting unit 11 is shown inverted and includes a base 13 and a platform 15 adapted to be secured on base 13.

Base 13 is provided with four reinforced countersunk screw openings 17, each adapted to receive a screw 33 which may be a No. 8 or No. 10 pan head sheet metal screw or other screw suitable for securing base 13 to a counter, shelf, or table of wood, metal, or plastic.

A flange 19 on base 13 gives contact with the counter shelf or the like over a large area for firm support of base 13. A cylinder 21 acts as the bearing on which platform 15 is supported and rotates. Cylinder 21 has a flat top surface 22 in the center of which is a small cylinder 23 coaxial with cylinder 21. Cylinder 23 has a circular opening 27 with two outwardly extending generally rectangular notches or slots 29 extending outwardly therefrom into a flange 25. A series of holes 31 in top surface 22 are equally spaced by approximately 20 degrees.

Platform 15 has reinforcing ribs 41 which extend radially from circular wall 43 which defines a recess in platform 15 that snugly receives cylinder 21 of base 13. A round post 45 in the center of platform 15 has extending outwardly therefrom a pair of generally rectangular lugs 47. Two holes 49 in platform 15 are provided for facility in removing this piece from a mold by serving as relief holes for the lugs 47; they are not functional features of the unit.

The lugs 47 are only slightly shorter end to end than the inside diameter of small cylinder 23, thus tending to act as a guide as platform 15 is rotated to engage lugs 47 in notches or slots 29.

Dome-like protrusions 51 in platform 15 are spaced from the center thereof to match the spacing of holes 31 in base 13 and protrusions 51 cooperate with holes 31 to serve as detents for the relative rotational motion of base 13 and platfrom 15. A plurality of reinforced counter-sunk screw openings 53 are molded in each of the corners of platform 15 and accomodate screws 55 to secure platform 15 to a television receiver underside. The multiplicity of holes 53 permit screws 55 to be placed in a selected position in the under side of the television receiver where they will have a firm purchase and not interfere with the functional parts of the TV; normally one screw would be placed near or at each corner of platform 15.

Base 13 is secured in the desired orientation before assembly of base 13 with platform 15. Base 13 usually will be secured with an orientation such that the normal orientation of the television receiver will be at right angles to the longitudinal axis of slots 29. The platform 15 is secured with the principal TV viewing angle lined up with the longitudinal axis of lugs 47; the TV will thus be turned in the normal direction when lugs 47 are turned at approximately right angles with respect to slots 29.

Figure 3:
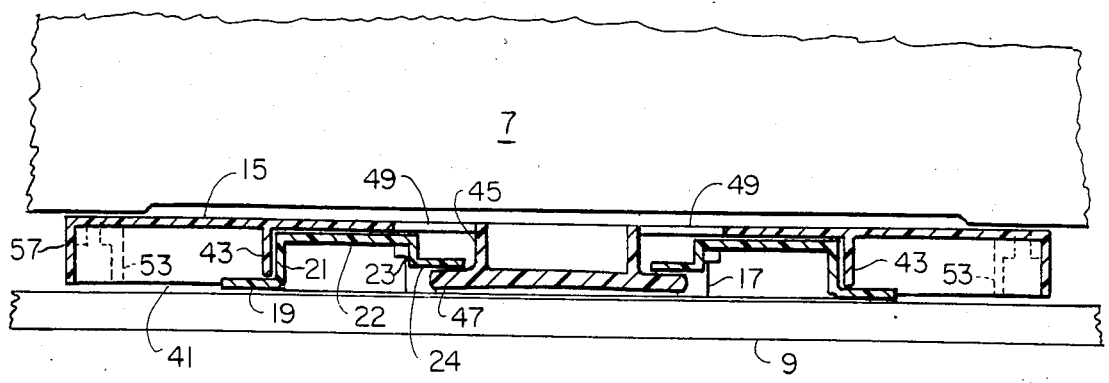
FIG. 3 is a fragmentary sectional view of the apparatus taken along the line 3—3 in FIG. 2.

Certain features of the invention can best be explained by reference to FIGS. 3, 4, and 5. In FIG. 3 it may be seen that when the base 13 and the platform 15 are assembled the dimensions of the two parts are such that lugs 47 are slightly bent or deformed by flange 25. Consequently, the platform and base are held together firmly with very little tendency to tilt or wobble. Furthermore any tendency of the platform to tilt with the television receiver is further limited by the small clearance of about 1/16 inch or less between the edge wall 57 of the platform and the top of the shelf 9.

Figure 5:
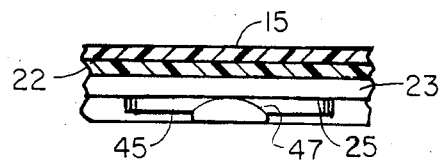
FIG. 5 is an enlarged fragmentary sectional view of the apparatus taken along the line 5—5 in FIG. 2.

As seen in FIG. 5 the lugs 47 are slightly rounded in cross section at the top so that they will slide from slots 29 onto flange 25 with facility. It should be noted that the detent projections 51 and the detent holes 31 are positioned to line up when the slots 29 are exactly at right angles to lugs 47; this position should be arranged to be halfway between the extreme viewing positions of the television receiver. Accordingly, swiveling of the television receiver during normal use will not cause the lugs 47 to pass over slots 29. However, it will be noted that there is no detent position corresponding to alignment of lugs 47 with slots 29 because there are nine holes for 180 degrees of travel and detent projection 51 would be halfway between the holes at lug and slot lineup. Unless one knowingly arranges the platform halfway between detent positions it is not easy to arrive at the aligned position of lugs 47 and slots 29 to inadvertently release the platfrom 15 from base 13. Although the embodiment of the rotatable mounting unit as shown is not intended as a security device, its structure and operation may delay a person unfamiliar with its construction for several minutes in removing the platform 15 and the television receiver 7 from the base 13. To give the rotatable mounting unit a security function it is only necessary to install a cabinet key lock device or other locking device in counter 9 at a position to limit the rotation of platform 15 to less than 90 degrees thus preventing it from being removed while the locking device is in place.

As the detent projections 51 on platform 15 are passing between holes 31 in base 13 platform 15 is raised slightly by about 1/32 to 1/16 of an inch. Since this makes it slightly more difficult to rotate lugs 47 onto flange 25 the detent projections 51 are not placed to align with the holes 31, which are on the axis of slots 29. This gives more opportunity for slight bending of platform 15 or of base 13 so that lugs 47 ride more easily out of slots 29 and under flange 25.

Figure 4:
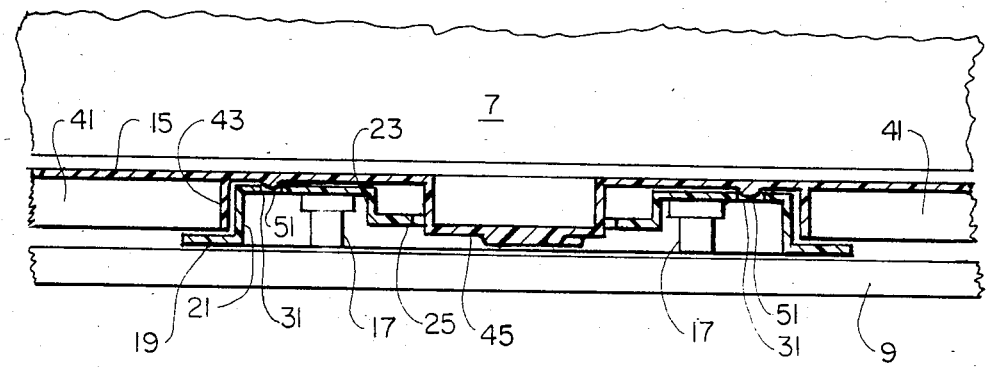
FIG. 4 is a fragmentary sectional view of the apparatus taken along the line 4—4 in FIG. 2.

Also in FIGS. 3 and 4 it should be noted that rim 43 forming the recess in platfrom 15 acts as a bearing surface for cylinder 21 of base 13 and the cooperation between these elements is what resists any lateral movement of platfrom 15 with respect to base 13. The large diameter of this bearing arrangement together with its rugged construction assures the durability and ruggedness of the rotatable mounting unit. If the post 45 and the flange 25 were relied upon as the bearing structure the rotatable mounting unit would be considerably less rugged.

This rugged construction is an important feature of the apparatus since one does not wish to have a television receiver of some twenty pounds or more convert itself into a projectile in a van or recreational vehicle in the event of an accident or a sudden deceleration.

While the apparatus has been described in the preferred embodiment in which it is molded of ABS plastic it will be understood that it may be formed of other types of high strength plastic such as "Lucite" or alternatively of metal, cast or otherwise formed. Also it should be noted that the circular shape of base 13 and the rectangular shape of platform 15 are preferred, but either of these shapes might be altered without changing the basic operation of the system. Also should the circumstances indicate, the mounting unit may be installed in an inverted position relative to that described above; that is, the platform may be used as a stationary element secured to a counter or the like while the base is used as a platform or mounting fixture for a rotatably mounted object.

In addition to the variations and modifications of the invention described or suggested above, other modifications and variations will be apparent to those of ordinary skill in the art, and accordingly the scope of the invention is not to be considered as limited to those embodiments and modifications described or suggested but is to be determined by reference to the appended claims.

What is claimed is:

1. A rotatable mounting unit for a cabinet or box comprising
    a base having a cylindrical projection comprising a recessed portion forming a flange with an opening in the center thereof,
    a plurality of equally spaced first detent elements around the top of said projection, at least one notch extending outwardly into said flange, a mounting platform having a circular rim thereon forming a recess to receive said projection, and a post having at least one lug extending radially therefrom which aligns with and passes into said notch for one rotational relation of said base and platform causing said lug to engage said flange and couple said platform to said base, said lug being positioned on said post so that it does not extend entirely through said notch and is resiliently deformable to pass out of said notch and onto said flange, said platform having a plurality of second detent elements located to match with said first detent elements for at least six relative rotational positions of said base and said platform.

2. Apparatus as recited in claim 1 wherein said platform is rectangular and its width and length are each greater than the greatest transverse dimension of said base.

3. Apparatus as recited in claim 1 wherein said detent elements are positioned so that they are not matched at the orientation for which said lug is aligned with said notch.

4. Apparatus as recited in claim 1 wherein said cylindrical projection is a snug fit in said recess thereby essentially restraining lateral movement of said platform with respect to said base.

5. Apparatus as recited in claim 1 wherein said platform is rectangular and is provided with a plurality of screw holes at each corner thereof.

6. Apparatus as recited in claim 1 wherein said base is circular and its diameter is less than the smallest transverse dimension of said mounting platform and further including screw holes in said base and in said mounting platform.

7. Apparatus as recited in claim 1 wherein the height of said cylindrical projection, the depth of said recess and the thickness of said base and said mounting platform are such that the lower edge of said mounting platform is less than about $\frac{1}{8}$ of an inch above the bottom surface of said base.

8. A rotatable mounting unit for installation in a recreational vehicle or the like comprising a unitary base of homogenous plastic material having in the center thereof a cylindrical upward projection from about three to about ten inches in diameter and comprising a recessed portion with a flange forming a smaller generally circular opening in the center thereof and at least three equally spaced aperture detent elements around and slightly spaced from the periphery of the top of said projections, said opening having a pair of oppositely extending notches and a unitary mounting platform of homogenous plastic material having a circular ring on the bottom thereof forming a recess to receive said projection, and a post at the center of said recess adapted to enter said recessed portions, said post having a pair of lugs extending radially therefrom which align with and pass into said notches for at least one rotational relation of said base and said platform, relative rotation of said base and platform causing said lug to engage the edge of said base around said opening and couple said platform to said base, said lug being positioned on said post so that it does not extend entirely through said notch and is resiliently deformable to pass out of said notch and onto said flange, said platform having a plurality of projecting detent elements less in number than said aperture detent elements and located to match with said aperture detent elements for at least six relative positions of said base and said platform.

9. Apparatus as recited in claim 8 wherein said platform is rectangular and its width and length are each greater than the greatest transverse dimension of said base.

10. Apparatus as recited in claim 8 wherein said detent elements are positioned so that they are not matched at the orientation for which said lug is aligned with said notch.

11. Apparatus as recited in claim 8 wherein said cylindrical projection is a snug fit in said recess thereby restraining lateral movement of said platform with respect to said base.

12. Apparatus as recited in claim 8 wherein said base is circular and its diameter is less than the smallest transverse dimension of said mounting platform.

13. Apparatus as recited in claim 8 wherein the height of said cylindrical projection, the depth of said recess and the thickness of said base and mounting platform are such that the lower edge of said mounting platform is less than about $\frac{1}{8}$ of an inch above the bottom surface of said base.

14. A rotatable mounting unit for a television receiver or the like comprising a base having a cylindrical projection from about three to about ten inches in diameter and comprising a recessed portion with a flange forming a smaller generally circular opening in the center thereof, a plurality of equally spaced first detent elements around and near the periphery of the top of said projections, said opening having a flange around the periphery thereof and at least one notch extending outwardly into said flange, a mounting platform having a circular rim on the bottom thereof forming a recess to snugly receive said projection, a post at the center of said recess adapted to enter said recessed portions, said post having at least one lug extending radially therefrom which aligns with and passes into said notch for one rotational relation of said base and said platform, relative rotation of said base and platform causing said lug to engage said flange and couple said platform to said base, said lug being positioned on said post so that it does not extend entirely through said notch and is resiliently deformable to pass out of said notch and onto said flange, said platform having a plurality of second detent elements unequal in number to said first detent elements and located to match with said first detent elements for at least six relative rotational positions of said base and said platform, said detent elements not being matched at the position for which said lug is aligned with said notch.

15. Apparatus as recited in claim 14 wherein said platform is rectangular and its width and length are both greater than the greatest transverse dimension of said base.

16. Apparatus as recited in claim 14 wherein said platform is oblong rectangular and is provided with a plurality of screw holes at each corner thereof.

17. Apparatus as recited in claim 16 wherein said base is circular and its said diameter is less than the smallest transverse dimension of said mounting platform and further including screw holes in said base.

18. Apparatus as recited in claim 16 where the height of said cylindical projection, the depth of said recess and the thickness of said base and said mounting platform are such that the lower edge of said mounting platfrom is less than about ⅛ of an inch above the bottom surface of said base.

* * * * *